(12) United States Patent
Holly et al.

(10) Patent No.: US 8,054,213 B2
(45) Date of Patent: Nov. 8, 2011

(54) MULTIPLE BEAM DIRECTED ENERGY SYSTEM

(75) Inventors: Sandor Holly, Woodland Hills, CA (US); Donald Elliot Harrington, Moorpark, CA (US); Nicholas Koumvakalis, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 196 days.

(21) Appl. No.: 12/578,090

(22) Filed: Oct. 13, 2009

(65) Prior Publication Data

US 2011/0084869 A1    Apr. 14, 2011

(51) Int. Cl.
 *G01S 13/88*  (2006.01)
 *G01S 7/38*  (2006.01)
(52) U.S. Cl. .............. 342/22; 342/27; 342/82; 342/372; 342/377
(58) Field of Classification Search .............. 342/22, 342/27, 82–88, 372, 377
See application file for complete search history.

(56) References Cited

U.S. PATENT DOCUMENTS

| 5,146,230 | A | * | 9/1992 | Hules | 342/374 |
|---|---|---|---|---|---|
| 5,969,675 | A | * | 10/1999 | Erlick | 342/373 |
| 6,043,779 | A | * | 3/2000 | Lalezari et al. | 342/371 |
| 6,864,825 | B2 | * | 3/2005 | Holly | 342/13 |
| 6,943,742 | B2 | | 9/2005 | Holly | |
| 6,950,076 | B2 | | 9/2005 | Holly | |
| 6,999,041 | B2 | | 2/2006 | Holly | |
| 7,009,575 | B2 | | 3/2006 | Holly et al. | |
| 7,142,147 | B2 | | 11/2006 | Holly | |
| 7,486,250 | B2 | | 2/2009 | Vetrovec et al. | |
| 7,893,862 | B2 | * | 2/2011 | Holly et al. | 342/22 |
| 2004/0120093 | A1 | * | 6/2004 | Holly | 361/143 |
| 2006/0109159 | A1 | | 5/2006 | Holly | |
| 2009/0040093 | A1 | * | 2/2009 | Holly et al. | 342/22 |
| 2009/0189091 | A1 | | 7/2009 | Holly et al. | |
| 2010/0001899 | A1 | * | 1/2010 | Holly et al. | 342/175 |
| 2011/0084869 | A1 | * | 4/2011 | Holly et al. | 342/27 |

OTHER PUBLICATIONS

EP Search report for application EP10177565 dated Mar. 4, 2011.

* cited by examiner

*Primary Examiner* — John Sotomayor
(74) *Attorney, Agent, or Firm* — Yee & Associates, P.C.

(57) ABSTRACT

A method and apparatus for transmitting beams of electromagnetic energy. A plurality of beams having a first number of frequencies and a number of beams having a second number of frequencies are transmitted. The plurality of beams and the number of beams overlap each other at an area with a pattern of intensities in the area. Difference frequency signals having a number of difference frequencies equal to a difference between the first number of frequencies and the second number of frequencies are monitored. The difference frequency signals are generated by an object having non-linear electrical characteristics in response to receiving the plurality of beams and the number of beams.

25 Claims, 13 Drawing Sheets

MULTIPLE BEAM DIRECTED ENERGY SYSTEM

BACKGROUND INFORMATION

1. Field

The present disclosure relates generally to detecting objects and, in particular, to a method and apparatus for detecting objects using electromagnetic radiation. Still more particularly, the present disclosure relates to a method and apparatus for transmitting beams of electromagnetic radiation.

2. Background

Improvised explosive devices are bombs constructed and deployed in manners not normally used by conventional military organizations. Improvised explosive devices may be used by terrorists, guerillas, and other forces. Improvised explosive devices may be placed on a roadway, either on the ground or under the ground. In some cases, an improvised explosive device may be carried in or on a car, a truck, or a person.

An improvised explosive device may have a power supply, a trigger, a detonator, a main charge, and a container. The improvised explosive device also may include shrapnel-generating objects, such as nails or ball bearings.

The trigger is a mechanism to set off the device. The trigger may be, for example, a radio signal, a tripwire, a timer, or a firing button. Improvised explosive devices also may employ cell phones, cordless phones, garage door openers, and/or other types of electronic devices as triggers.

To counter improvised explosive devices, jamming systems have been used to prevent setting off improvised explosive devices. Although jamming systems may be used to prevent setting off improvised explosive devices, these types of jamming systems do not detect the presence of or disarm the device.

Additionally, various technologies have been used to identify improvised electronic devices. These technologies involve using radar, x-rays, and pre-detonators.

For example, some detection systems include a stoichiometric diagnostic device. This type of device is capable of deciphering chemical signatures of unknown substances through metal or other barriers. An example of another detection device is a laser-induced breakdown spectroscopy system.

This type of system is capable of detecting traces of explosives used for improvised explosive devices from distances, such as about 30 meters. Some improvised explosive devices, however, may not emit chemicals or have detectable amounts of explosives.

Therefore, it would be advantageous to have a method and apparatus that takes into account one or more of the issues discussed above, as well as possibly other issues.

SUMMARY

In one advantageous embodiment, an apparatus comprises a transmitter system, a receiver system, and a processor unit connected to the transmitter system and the receiver system. The transmitter system is configured to transmit a plurality of beams having a first number of frequencies and a number of beams having a second number of frequencies. The receiver system is capable of monitoring for difference frequency signals having a number of difference frequencies equal to a difference between the first number of frequencies and the second number of frequencies. The difference frequency signals are generated by an object having non-linear electrical characteristics in response to receiving the plurality of beams and the number of beams. The processor unit is configured to control operation of the transmitter system to transmit the plurality of beams having the first number of frequencies and the number of beams having the second number of frequencies to overlap in an area with a pattern of intensities in the area.

In another advantageous embodiment, a method is present for transmitting beams of electromagnetic energy. A plurality of beams having a first number of frequencies and a number of beams having a second number of frequencies are transmitted. The plurality of beams and the number of beams overlap each other at an area with a pattern of intensities in the area. Difference frequency signals having a number of difference frequencies equal to a difference between the first number of frequencies and the second number of frequencies are monitored. The difference frequency signals are generated by an object having non-linear electrical characteristics in response to receiving the plurality of beams and the number of beams.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
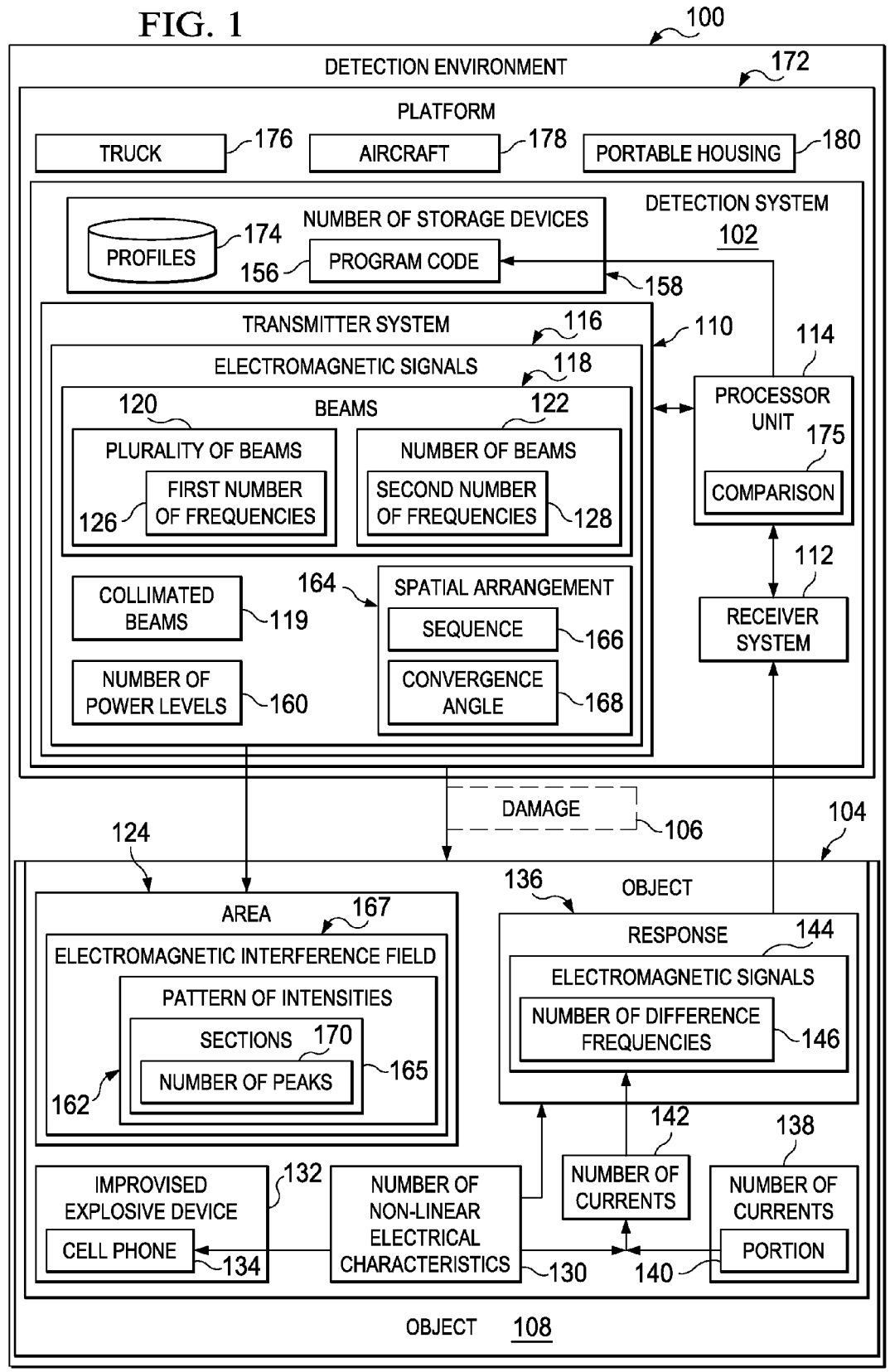
FIG. 1 is an illustration of a detection environment in accordance with an advantageous embodiment.

The different advantageous embodiments recognize and take into account that currently available systems for countering improvised explosive devices may be unable to detect a presence of an improvised explosive device. For example, the different advantageous embodiments recognize and take into account that jamming systems may prevent an improvised explosive device from being detonated.

Detonation is prevented only while the jamming system is active and/or is located in a location around the improvised explosive device. Once the jamming system is moved or turned off, the improvised explosive device may still be used and pose a danger and/or hazard to vehicles and/or personnel in the vicinity of the improvised explosive device.

Further, some currently used techniques may be able to detect a presence of an improvised explosive device but are unable to identify the particular type of device. The different advantageous embodiments recognize and take into account that knowing the type of device being used may aid in disarming or avoiding the device.

The different advantageous embodiments also recognize and take into account that it would be desirable to detonate and/or disable explosive devices in a controlled manner in some situations. For example, once the improvised explosive device is detected, it may be desirable to disable the improvised explosive device. In some cases, the improvised explosive device may be detonated to reduce the time needed to clear a road or other area.

The different advantageous embodiments recognize and take into account that one potential solution is to use non-linear radar systems to remotely detect and identify targets. These types of systems may transmit electromagnetic energy in the form of electromagnetic signals to an area in which an object may be located. In particular, these signals may be radio frequency (RF) electromagnetic signals.

The different advantageous embodiments also recognize and take into account that these types of systems may be difficult to use when an object is buried in sand or soil, located under another object or rubbish, or is in some other unsuitable location.

The different advantageous embodiments recognize and take into account that detection of these types of objects may be accomplished if the electromagnetic signals have sufficient strength to generate a response in an object that can be detected by a receiver.

The different advantageous embodiments further recognize and take into account that one manner in which objects may be detected at longer distances may involve increasing the power output of the non-linear radar systems transmitting the electromagnetic signals. These systems include transmitters.

The different advantageous embodiments further recognize and take into account that using transmitters with a higher power output increases the power consumed by a detection system. Additionally, the components used in transmitters to increase the power output of the transmitters may increase the size of a detection system.

Another solution recognized and taken into account by the different advantageous embodiments involves improving the sensitivity and/or selectivity of the receiver detecting the response to the electromagnetic signals. Using receivers with improved sensitivity and/or selectivity in detection systems may increase the cost of these detection systems.

Still further, the different advantageous embodiments recognize and take into account that with these types of receivers, the size of the detection systems also may be increased. Further, more sensitive and/or selective receivers and transmitters with a higher power output may use metal components that have failures or tolerances that may require more frequent maintenance. These types of transmitters and/or receivers may decrease the reliability of the detection systems.

The different advantageous embodiments recognize and take into account that the strength of an electromagnetic signal at an object may be measured in a number of different ways. One manner in which the strength of an electromagnetic signal at an object may be measured is in the form of intensity. Intensity is a measure of the time-average energy flux. The different advantageous embodiments provide a method and apparatus for controlling the intensity of an electromagnetic signal at an object.

Further, the different advantageous embodiments provide a capability to transmit radio frequency electromagnetic signals that have a desired intensity at a target location where an object may be present. The transmission of these electromagnetic signals may be performed in a manner that does not require the transmitters to have increased power output.

Thus, the different advantageous embodiments provide a method and apparatus for transmitting electromagnetic energy. In one advantageous embodiment, an apparatus comprises a transmitter system, a receiver system, and a processor unit. The transmitter system is configured to transmit a plurality of beams having a first number of frequencies and a number of beams having a second number of frequencies. The receiver system is capable of monitoring for difference frequency signals having a number of difference frequencies equal to a difference between the first number of frequencies and the second number of frequencies.

The difference frequency signals are generated by an object having non-linear electrical characteristics in response to receiving the plurality of beams and the number of beams. The processor unit is connected to the transmitter system and the receiver system. The processor unit is configured to control operation of the transmitter system to transmit the plurality of beams having the first number of frequencies and the number of beams having the second number of frequencies to overlap in an area with a pattern of intensities in the area.

With reference now to FIG. 1, an illustration of a detection environment is depicted in accordance with an advantageous embodiment. Detection environment 100 includes detection system 102. Detection system 102 may be used to identify object 104. Additionally, in these illustrative examples, detection system 102 also may be used to cause damage 106 to object 104.

In these illustrative examples, non-linear radar technology is used by detection system 102 to detect object 104. Detecting object 104 comprises at least one of detecting a presence of object 104 and identifying object 104. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In these illustrative examples, object 104 may be detected by detection system 102 even if object 104 is hidden by object 108. Object 104 may be hidden behind object 108, located within object 108, or under object 108 in these examples. Object 108 may be, for example, without limitation, a box, fog, the ground, and/or some other object that may be used to obscure and/or hide object 104 from view. Of course, in some illustrative examples, object 104 may not be obscured by object 108.

In these illustrative examples, detection system 102 includes transmitter system 110, receiver system 112, and processor unit 114. Transmitter system 110 is capable of transmitting electromagnetic signals 116 in the form of beams 118. Beams 118 include plurality of beams 120 and number of beams 122. In these advantageous embodiments, beams 118 take the form of collimated beams 119. In other advantageous embodiments, beams 118 may take other suitable forms.

A collimated beam, in these examples, is electromagnetic radiation in the form of rays that are substantially parallel. The collimated beam spreads more slowly as the electromagnetic radiation propagates as compared to electromagnetic radiation that has not been collimated. In these illustrative examples, plurality of beams 120 and number of beams 122 are transmitted by transmitter system 110 in a manner such that plurality of beams 120 and number of beams 122 overlap at area 124.

In these illustrative examples, plurality of beams 120 has first number of frequencies 126, and number of beams 122 has second number of frequencies 128. In these illustrative examples, first number of frequencies 126 may include frequencies different from second number of frequencies 128. A number of items, as used herein, refers to one or more items. For example, first number of frequencies 126 is one or more frequencies. In a similar manner, second number of frequencies 128 is one or more frequencies.

Object 104 has number of non-linear electrical characteristics 130. Electrical characteristics may include, for example, without limitation, conductive, capacitive, inductive, and/or other types of electrical characteristics. Number of non-linear electrical characteristics 130 may include two types of metals in layers in object 104. Number of non-linear electrical characteristics 130 also may include, for example, without limitation, a corroded or oxidized portion of object 104 that has a different non-linear electrical characteristic from a non-corroded or non-oxidized portion of object 104.

As yet another example, object 104 may include a number of electronic circuits with non-linear components. These non-linear components may be, for example, without limitation, diodes, transistors, and/or other suitable components with number of non-linear electrical characteristics 130.

In these illustrative examples, object 104 may be improvised explosive device 132 containing cell phone 134 as a trigger. Cell phone 134 contains components with number of non-linear electrical characteristics 130 in these illustrative examples. These components may be, for example, without limitation, diodes, transistors, and/or other suitable components.

The particular components located within cell phone 134 and/or the arrangement of the components is used to identify cell phone 134 as a cell phone using detection system 102. Also, a particular model and type may be identified for cell phone 134 based on the components making up cell phone 134. Of course, object 104 may be any object containing number of non-liner electrical characteristics 130.

In these illustrative examples, when plurality of beams 120 and number of beams 122 encounter object 104 at area 124, response 136 is generated by number of non-linear electrical characteristics 130 for object 104. Electromagnetic signals 116 having first number of frequencies 126 and second number of frequencies 128 cause number of currents 138 to be generated, while electromagnetic signals 116 encounter object 104 at area 124.

First number of frequencies 126 may be a first frequency f1, while second number of frequencies 128 may be a second frequency f2. In some advantageous embodiments, first number of frequencies 126 may include frequencies f1 and f2, and second number of frequencies 128 may include frequencies f1 and f2. In yet other advantageous embodiments, other numbers of frequencies may be present. For example, first number of frequencies 126 may include first frequency f1 and second frequency f2, while second number of frequencies 128 may include third frequency f3 and fourth frequency f4.

Portion 140 of number of currents 138 may be converted to and/or rectified by number of non-linear electrical characteristics 130 in object 104 into number of currents 142. Number of currents 142 reradiates as electromagnetic signals 144 to form response 136. Response 136 is detected by receiver system 112 in these illustrative examples.

Electromagnetic signals 144 in response 136 have number of difference frequencies 146. Number of difference frequencies 146 is equal to a difference between first number of frequencies 126 and second number of frequencies 128. Additionally, if frequencies within first number of frequencies 126 are different from each other, number of difference frequencies 146 may include differences between those frequencies. In a similar fashion, if frequencies in second number of frequencies 128 are different from each other, number of difference frequencies 146 also may be based on the difference between those frequencies.

Additionally, receiver system 112 may be configured to be insensitive to frequencies other than number of difference frequencies 146. As a result, receiver system 112 may be insensitive to background noise that may be caused by reflections of plurality of beams 120 and number of beams 122 by object 104, object 108, and/or other objects or materials. Plurality of beams 120 and number of beams 122 may be transmitted at higher intensities without worrying about electromagnetic signals 116 coupling into receiver system 112 and possibly blinding and/or saturating receiver system 112.

In these illustrative examples, processor unit 114 executes program code 156 in number of storage devices 158 to control the operation of transmitter system 110 and receiver system 112. Processor unit 114 may be, for example, without limitation, a central processing unit, a plurality of processors, a multi-core processor, a digital signal processor, and/or some other suitable type of processing device. Number of storage devices 158 may be, for example, without limitation, a memory, a persistent storage, a random access memory, a hard drive, a solid state disk drive, a thumb drive, a memory stick, and/or some other suitable type of storage device.

Program code 156 is stored on number of storage devices 158 in a functional form for execution by processor unit 114. Program code 156 may be stored on one or more number of storage devices 158 in these examples.

Program code 156 may be executed by processor unit 114 to control transmitter system 110 to change a number of frequencies in at least one of first number of frequencies 126 and second number of frequencies 128. In the different advantageous embodiments, the frequency ranges used may vary, depending on the particular application.

In these illustrative examples, first number of frequencies 126 and second number of frequencies 128 may be selected from a number of different frequencies. For example, without limitation, first number of frequencies 126 and second number of frequencies 128 may be selected from frequencies and ranges, such as those for very high frequency (VHF) signals, ultra high frequency (UHF) signals, microwave signals, millimeter wave signals, and/or other suitable types of signals. These signals may vary in frequency from about 30 megahertz to about 300 gigahertz. This range of frequencies corresponds to a wavelength from about 1 millimeter to about 10,000 millimeters. The use of high or low frequency bands also may be used in other advantageous embodiments. Of course, the range may change, depending on the particular application, and where object 104 is located.

Additionally, processor unit 114 is configured to operate transmitter system 110 to change number of power levels 160 for plurality of beams 120 and number of beams 122. This change in number of power levels 160 may be performed to obtain increased range in detecting object 104 or to generate damage 106 in object 104.

In the different illustrative examples, processor unit 114 controls transmitter system 110 to transmit plurality of beams 120 and number of beams 122 in a manner such that plurality of beams 120 overlaps number of beams 122 in area 124.

In these illustrative examples, an overlap of plurality of beams 120 and number of beams 122 means that all of the beams overlap each other. In other words, all of the beams in beams 118 overlap each other in area 124. The overlap may mean that only a portion of a beam overlaps another beam or all of one beam overlaps another beam.

This overlap generates pattern of intensities 162 in area 124. In these examples, intensity is power density in watts per square meter. For a plane wave or substantially plane wave, intensity is as follows:

$$I = c\frac{\varepsilon}{2} * \langle E^2 \rangle + c\frac{1}{2\mu} * \langle H^2 \rangle$$

where I is intensity, $\varepsilon$ is permittivity, E is an electrical field, $\mu$ is permeability, and H is a magnetic field. The quantity of $\langle E^2 \rangle$ is used to refer to a measure of intensity.

Sections 165 are present in pattern of intensities 162. Sections 165 may be stationary or may move within area 124 as a function of time. In these illustrative examples, sections 165 may be, for example, without limitation, parallel linear sections, concentric circular sections, or sections with some other suitable shape. Plurality of beams 120 and number of beams 122 are transmitted by transmitter system 110 with spatial arrangement 164. In these illustrative examples, spatial arrangement 164 is the positioning of plurality of beams 120 and number of beams 122 with respect to each other.

For example, spatial arrangement 164 may be a one-dimensional array, a two-dimensional array, an array in a shape of a circle, an array in a shape of a curve, or some other suitable spatial arrangement. Spatial arrangement 164 also may have sequence 166. Sequence 166 is selected based on characteristics for each beam in beams 118 such that pattern of intensities 162 is generated in area 124. For example, sequence 166 may be selected based on first number of frequencies 126 for plurality of beams 120 and second number of frequencies 128 for number of beams 122.

Spatial arrangement 164 and sequence 166 of beams within plurality of beams 120 and number of beams 122 may be used to selectively cause sections 165 in pattern of intensities 162 to remain stationary or move.

Plurality of beams 120 and number of beams 122 are spatially arranged and directed to area 124 such that beams 118 have convergence angle 168. In other words, each beam within beams 118 has convergence angle 168 with respect to an adjacent beam within plurality of collimated beams 119. The arrangement of plurality of beams 120 and number of beams 122 may result in plurality of beams 120 being interspersed within number of beams 122.

Further, sections 165 have number of peaks 170. Each segment in sections 165 has a peak. In other words, a segment within sections 165 may have an intensity that increases and decreases as a function of time. In these illustrative examples, sections 165 may be selectively moved to cause one or more of number of peaks 170 to move onto an object or portion of an object. Sections 165 may be moved by adjusting the frequencies of beams 118.

In one illustrative example, plurality of beams 120 may comprise two collimated beams, and number of beams 122 may comprise two collimated beams. With four collimated beams, the overlap of these beams in area 124 generates electromagnetic interference field 167 with pattern of intensities 162 in area 124. Number of peaks 170 may have a higher intensity as compared to transmitting collimated beams in which electromagnetic interference field 167 does not have pattern of intensities 162.

In these illustrative examples, response 136 may be recorded and/or analyzed in real time. In other words, response 136 may be recorded and then analyzed as fast as processor unit 114 can process response 136. In other words, intentional delays, such as storing response 136 and then processing response 136 after some period of time, are not needed.

Response 136 is compared to a number of profiles 174 to form comparison 175. Comparison 175 is used to determine whether object 104 matches a profile in profiles 174. The determination may identify object 104 as being known within profiles 174. In other illustrative examples, object 104 may be identified as an unknown object within profiles 174.

In this manner, the different advantageous embodiments provide a capability to not only detect a presence of object 104, but also to possibly identify object 104. The different advantageous embodiments provide a capability to detect object 104 at distances that are greater than using transmitter systems that do not generate pattern of intensities 162. In the different advantageous embodiments, number of peaks 170 in pattern of intensities 162 allows response 136 to be generated at greater distances than possible if number of peaks 170 in pattern of intensities 162 were absent.

The illustration of detection environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

In some advantageous embodiments, additional beams, in addition to plurality of beams 120 and number of beams 122, may be transmitted by transmitter system 110 to other areas in addition to area 124. In this manner, additional objects may be identified in addition to object 104.

In these illustrative examples, detection system 102 may be associated with platform 172. Detection system 102 may be located on, attached to, or otherwise associated with platform 172. Platform 172 may take a number of different forms, depending on the particular implementation. For example, platform 172 may be truck 176, aircraft 178, portable housing 180, and/or some other suitable type of platform.

Figure 2:
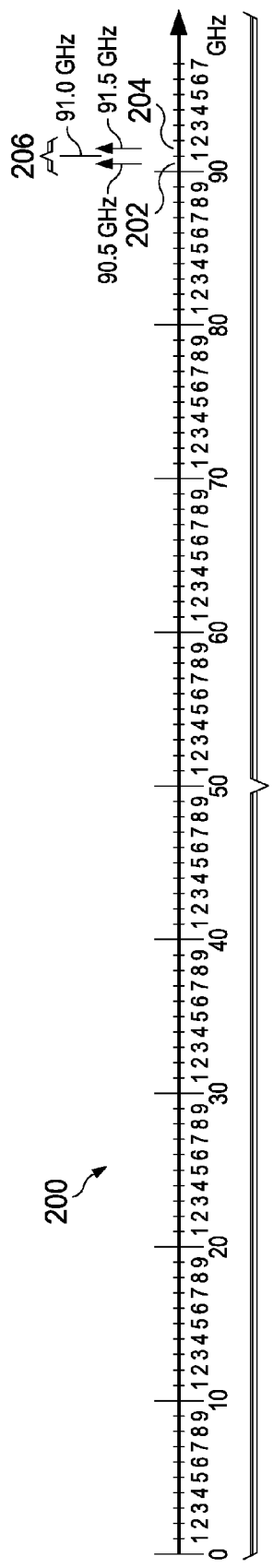
FIG. 2 is an illustration of locations of a pair of millimeter wave frequencies that may be used to transmit collimated beams on the direct current to the millimeter wave spectral domain in accordance with an advantageous embodiment.

Turning now to FIG. 2, an illustration of locations of a pair of millimeter wave frequencies that may be used to transmit collimated beams on the direct current to the millimeter wave spectral domain is depicted in accordance with an advantageous embodiment. Graph 200 illustrates electromagnetic frequency ranges that may be used by transmitter system 110 in detection system 102 in FIG. 1.

Millimeter wave signals have a wavelength from about one centimeter to about one millimeter and have a frequency from about 30 gigahertz to about 300 gigahertz. In this illustrative example, graph 200 illustrates the electromagnetic frequency range from about zero hertz direct current (DC) to about 100 gigahertz.

In the illustrative examples, detection system 102 in FIG. 1 may generate plurality of beams 120 having first number of frequencies 126 and number of beams 122 having second number of frequencies 128. As one example, a beam in plurality of beams 120 may have a frequency of about 90.5 gigahertz at point 202, and a beam in number of beams 122 may have a frequency of about 91.5 gigahertz at point 204. These two frequencies have difference frequency 206, which is about one gigahertz in these illustrative examples.

Figure 3:
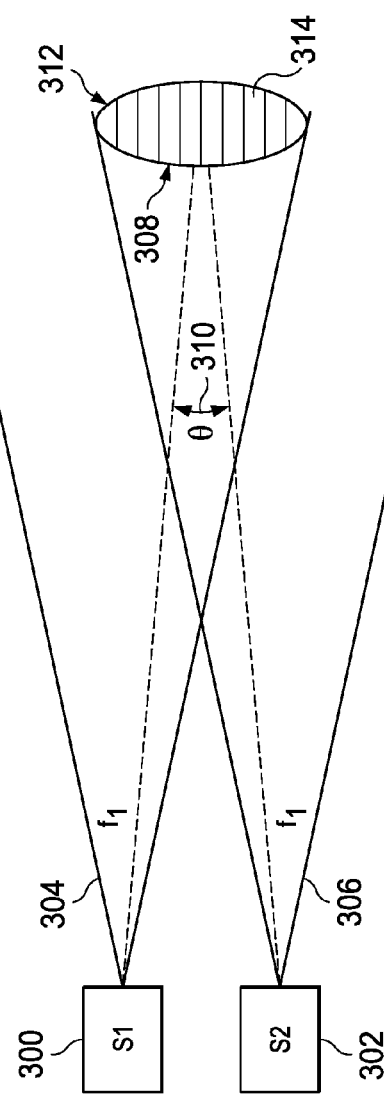
FIG. 3 is an illustration of a pattern in an area where collimated beams having the same frequency overlap in accordance with an advantageous embodiment.

With reference now to FIG. 3, an illustration of a pattern of intensities in an area where collimated beams having the same frequency overlap is depicted in accordance with an advantageous embodiment. In this illustrative example, transmitter 300 and transmitter 302 are examples of transmitters that may be present in transmitter system 110 in detection system 102 in FIG. 1. Transmitter 300 and transmitter 302 transmit electromagnetic energy in the form of collimated beams. As depicted in this example, transmitter 300 and transmitter 302 emit collimated beam 304 and collimated beam 306. Collimated beam 304 and collimated beam 306 both have frequency f1.

In this illustrative example, collimated beam 304 and collimated beam 306 overlap in area 308. In this example, collimated beam 304 and collimated beam 306 are spatially arranged in a sequence to overlap in area 308. In this example, the sequence is merely collimated beam 304 followed by collimated beam 306. The spatial arrangement of collimated beam 304 and collimated beam 306 is such that convergence angle 310 is present. Convergence angle 310 is the angle measured from area 308 between source 300 and source 302. In this example, convergence angle 310 is measured from the center or middle of area 308.

Pattern of intensities 312 is present in area 308. Pattern of intensities 312 is stationary in these illustrative examples. Pattern of intensities 312 includes sections 314. Sections 314 also may be referred to as fringes. Sections 314 do not move, because both collimated beam 304 and collimated beam 306 have frequency f1.

Figure 4:
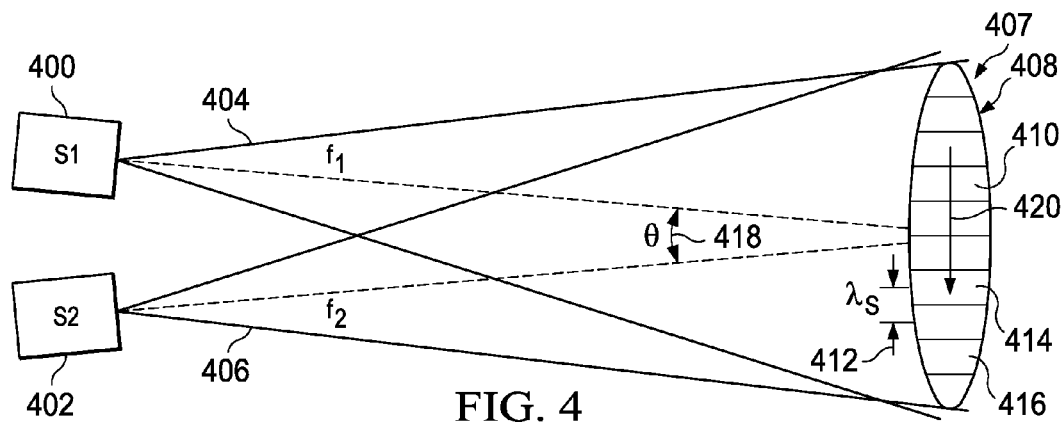
FIG. 4 is an illustration of collimated beams transmitted by two sources with different frequencies in accordance with an advantageous embodiment.

With reference now to FIG. 4, an illustration of collimated beams transmitted by two transmitters with different frequencies is depicted in accordance with an advantageous embodiment. Transmitter 400 and transmitter 402 are examples of transmitters that may be present within transmitter system 110 in FIG. 1.

Transmitter 400 transmits collimated beam 404 with frequency f1, while transmitter 402 transmits collimated beam 406 with frequency f2. In this example, collimated beam 404 and collimated beam 406 also are spatially arranged in a sequence with respect to each other. Collimated beam 404 overlaps with collimated beam 406 in area 407. In this example, pattern of intensities 408 is present in area 407.

Pattern of intensities 408 comprises sections 410. In these examples, a distance between sections 410 may be identified. Distance 412 is a distance between section 414 and section 416. In these illustrative examples, distance 412 is present between each pair of adjacent sections in pattern of intensities 408. Distance 412 may be calculated as follows:

$$\lambda_s = \frac{\lambda_o}{2\left[\sin\left(\frac{\theta}{2}\right)\right]}$$

where $\lambda_s$ is distance 412, $\lambda_o$ is the wavelength of a difference frequency, $\theta$ is a convergence angle, such as angle 418. A convergence angle is the angle at which collimated beam 404 and collimated beam 406 overlap in area 407.

In these examples, frequency f1 for collimated beam 404 is different from frequency f2 for collimated beam 406. This difference is the difference frequency. The difference frequency results in movement of pattern of intensities 408 within area 407. This movement is in the direction of arrow 420 in this example.

Figure 5:
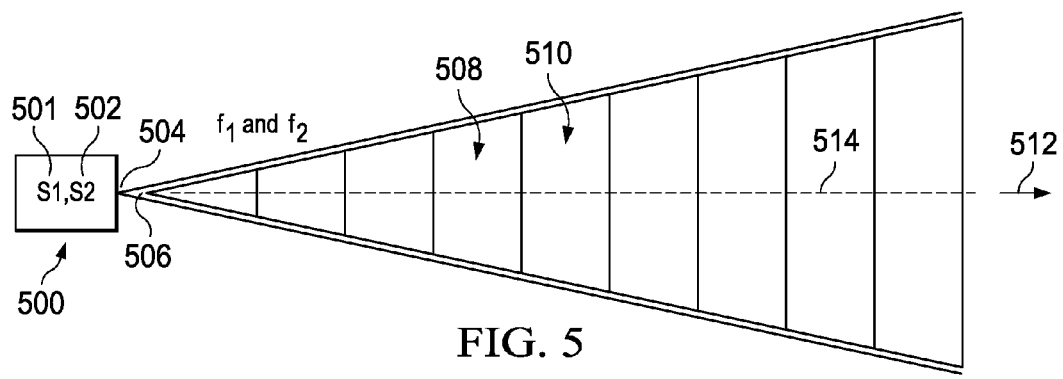
FIG. 5 is an illustration of collimated beams transmitted by two sources in accordance with an advantageous embodiment.

With reference now to FIG. 5, an illustration of collimated beams transmitted by two transmitters is depicted in accordance with an advantageous embodiment. In this illustrative example, transmitter system 500 is an example of one implementation of transmitter system 110 in detection system 102 in FIG. 1. Transmitter system 500 includes transmitter 501 and transmitter 502.

In this illustrative example, transmitter 501 and transmitter 502 emit electromagnetic signals in the form of collimated beam 504 and collimated beam 506. Collimated beam 504 has frequency f1, and collimated beam 506 has frequency f2. As depicted, collimated beam 504 and collimated beam 506 are emitted through the same aperture of transmitter system 500. In other words, transmitter 501 and transmitter 502 emit collimated beam 504 and collimated beam 506 substantially collinearly through an aperture of transmitter system 500. The aperture may be part of an antenna system associated with transmitter system 500.

In this depicted example, collimated beam 504 and collimated beam 506 are emitted substantially collinearly such that pattern of intensities 508 is present. Sections 510 in pattern of intensities 508 move in the direction of arrow 512 along axis 514.

Figure 6:
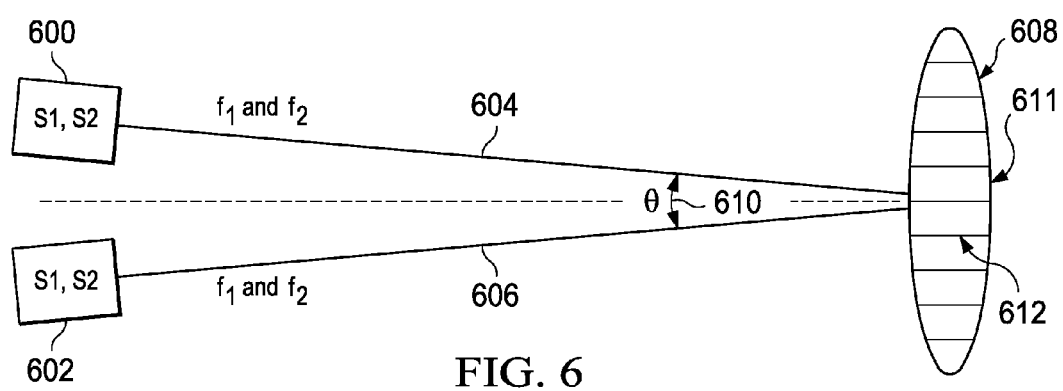
FIG. 6 is an illustration of collimated beams transmitted by four sources in accordance with an advantageous embodiment.

With reference now to FIG. 6, an illustration of collimated beams transmitted by four transmitters is depicted in accordance with an advantageous embodiment. Transmitters 600 and 602 are examples of transmitters that may be present in transmitter system 110 in FIG. 1.

In this example, transmitter 600 transmits beam 604, while transmitter 602 transmits beam 606. Beam 604 is comprised of two collimated beams having frequency f1 and f2. Beam 606 is also comprised of two collimated beams having frequencies f1 and f2.

Beam 604 and beam 606 are spatially arranged with respect to each other to overlap in area 608. Beam 604 and beam 606 have convergence angle 610 in these examples. Pattern of intensities 611 is present in area 608. In this example, sections 612 within pattern of intensities 611 are stationary. Movement of sections 612 does not occur in this example at area 608. Sections 612 are stationary, because the difference frequency of beam 604 and beam 606 is the same. The difference frequency is the difference between frequency f1 and frequency f2 in this example.

Beam 604 and beam 606 each generate sections in pattern of intensities 611 that move. In these examples, the selection of frequencies f1 and f2 are reversed from each other in this example. The selection of frequencies f1 and f2, along with the spatial arrangement of beam 604 and beam 606, result in sections 612 in pattern of intensities 611 that are stationary in these examples.

More specifically, the movement of sections for transmitter 600 is opposite the movement of sections for transmitter 602. The result is pattern of intensities 611 with sections 612 that are stationary. With sections 612 being stationary, individual sections may be directed towards portions of an object or an object by moving beam 604 and beam 606.

Additionally, in this example, the intensities of the peaks in pattern of intensities 611 are increased about 16 times with respect to the intensity of a single collimated beam in beam 604 or beam 606.

Figure 7:
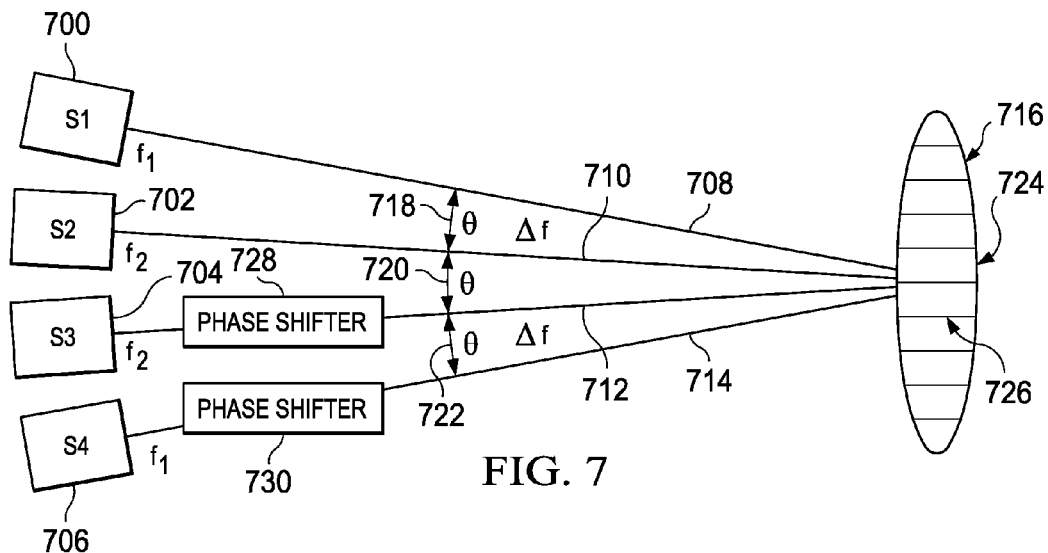
FIG. 7 is an illustration of collimated beams transmitted by a transmitter system in accordance with an advantageous embodiment.

With reference now to FIG. 7, an illustration of collimated beams transmitted by a transmitter system is depicted in accordance with an advantageous embodiment. In this example, transmitters 700, 702, 704, and 706 are examples of transmitters that may be found in transmitter system 110 in FIG. 1.

Collimated beam 708 is transmitted by transmitter 700, collimated beam 710 is transmitted by transmitter 702, collimated beam 712 is transmitted by transmitter 704, and collimated beam 714 is transmitted by transmitter 706.

Collimated beam 708 has frequency f1, collimated beam 710 has frequency f2, collimated beam 712 has frequency f2, and collimated beam 714 has frequency f1. The spatial arrangement of transmitters 700, 702, 704, and 706 has a sequence such that collimated beams 708, 710, 712, and 714 overlap in area 716. The sequence of the collimated beams is such that frequencies f1 and f2 have a sequence of f1, f2, f2, and f1.

In this example, collimated beam 708 and collimated beam 710 may be an example of plurality of beams 120 in FIG. 1, while collimated beam 712 and collimated beam 714 may be considered an example of number of beams 122 in FIG. 1. The arrangement of the collimated beams is such that the frequencies are a mirror image of each other between the plurality of beams and the number of beams in these illustrative examples.

Collimated beams 708, 710, 712, and 714 overlap in area 716 with convergence angles 718, 720, and 722. In this illustrative example, angles 718, 720, and 722 have the same value.

In these examples, transmitters 700, 702, 704, and 706 are arranged such that the convergence angle where the overlap occurs is the same between two adjacent transmitters. For example, convergence angle 718 is present between collimated beam 708 and collimated beam 710. Convergence angle 720 is present between collimated beam 710 and collimated beam 712. Convergence angle 722 is present between collimated beam 712 and collimated beam 714.

In these examples, these transmitters are evenly distributed such that the different collimated beams have the same spacing between each other. In other words, the spacing between the transmitters and the direction of the transmitters are such that they all have the same value for the angle at which collimated beams 708, 710, 712, and 714 overlap in area 716.

Pattern of intensities 724 with sections 726 are present in area 716. Sections 726 are stationary in these illustrative examples. The sections are stationary because of the spatial arrangement of collimated beams 708, 710, 712, and 714 with a sequence of frequencies. In this example, the sequence of frequencies is f1, f2, f2, f1. This sequence results in two difference frequencies that have sections within sections 726 that move in directions opposite of each other. The difference frequency is the same such that the movement between sections for the two difference frequencies cancels each other. As a result, sections 726 in pattern of intensities 724 remain stationary in area 716.

Of course, sections 726 may be selectively moved in area 716 without moving collimated beams 708, 710, 712, and 714. This movement may be caused by shifting frequency f2 for collimated beam 712 and shifting frequency f1 for collimated beam 714 such that the difference frequency for these two collimated beams changes. This shift in frequency may be initiated using phase shifter 728 and phase shifter 730. Of course, components in transmitter 704 and transmitter 706 also may be used to change the frequencies.

Phase shifter 728 and phase shifter 730 may be used to align the phases of collimated beams 708, 710, 712, and 714. The phases are aligned such that the peaks of pattern of intensities 724 have higher intensities as compared to the phases of collimated beams 708, 710, 712, and 714 not being aligned.

The speed at which sections 726 move depends on the amount of change in the values of frequency f2 and frequency f1 for collimated beam 712 and collimated beam 714. A larger amount of change in the values of frequency f2 and frequency f1 for these collimated beams results in a faster movement of sections 726.

Figure 8:
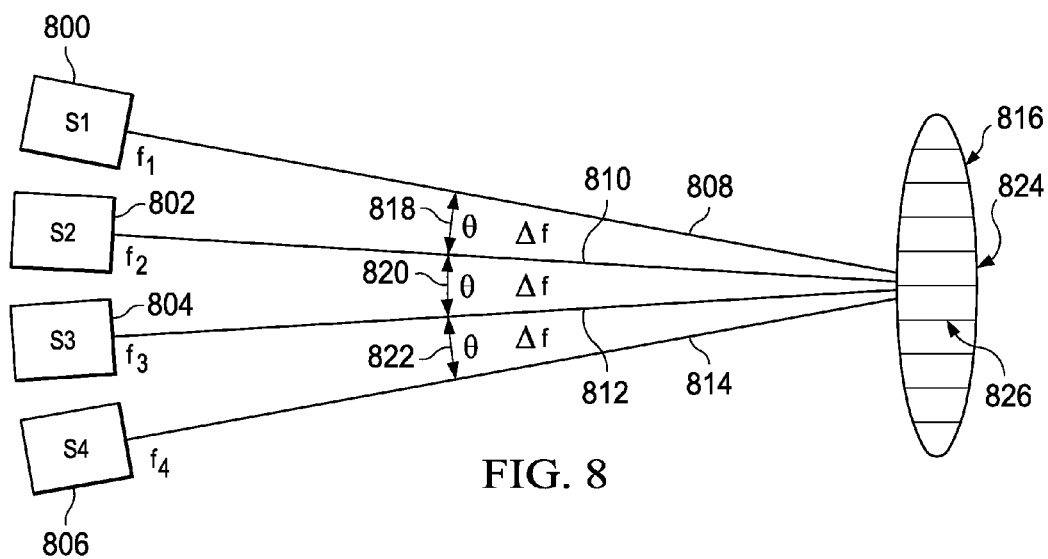
FIG. 8 is an illustration of collimated beams transmitted by a transmitter in accordance with an advantageous embodiment.

With reference now to FIG. 8, an illustration of collimated beams transmitted by a transmitter is depicted in accordance with an advantageous embodiment. In this illustrative example, transmitters 800, 802, 804, and 806 are examples of transmitters that may be found in transmitter system 110 in detection system 102 in FIG. 1.

In this illustrative example, transmitter 800 transmits collimated beam 808, transmitter 802 transmits collimated beam 810, transmitter 804 transmits collimated beam 812, and transmitter 806 transmits collimated beam 814. Collimated beam 808 has frequency f1, collimated beam 810 has frequency f2, collimated beam 812 has frequency f3, and collimated beam 814 has frequency f4.

In this illustrative example, these collimated beams overlap in area 816. The overlap of the beams is such that collimated beam 808 and collimated beam 810 have angle 818. Collimated beam 810 and collimated beam 812 have angle 820. Collimated beam 812 and collimated beam 814 have angle 822.

This spatial arrangement of collimated beams 808, 810, 812, and 814 has a sequence such that the corresponding frequencies result in pattern of intensities 824, which have sections 826.

In this example, the selection of frequencies for the transmitters results in three difference frequencies being present. A first difference frequency is present between frequency f1 for collimated beam 808 and frequency f2 for collimated beam 810. A second difference frequency is present between frequency f2 for collimated beam 810 and frequency f3 for collimated beam 812. A third difference frequency is present between frequency f3 for collimated beam 812 and frequency f4 for collimated beam 814.

These difference frequencies may be generated by an object at area 816 that has non-linear electrical characteristics. In these illustrative examples, sections 826 remain stationary because of the selection of the sequence of frequencies for the collimated beams. Of course, the frequencies may be adjusted to cause sections in sections 826 to move. This adjustment may be such that the sections move in a desired direction. Further, the sections may be moved to a desired location.

With reference now to FIGS. 9-13, illustrations of graphs illustrating intensities in an area in which collimated beams overlap is depicted in accordance with an advantageous embodiment.

Figure 9:
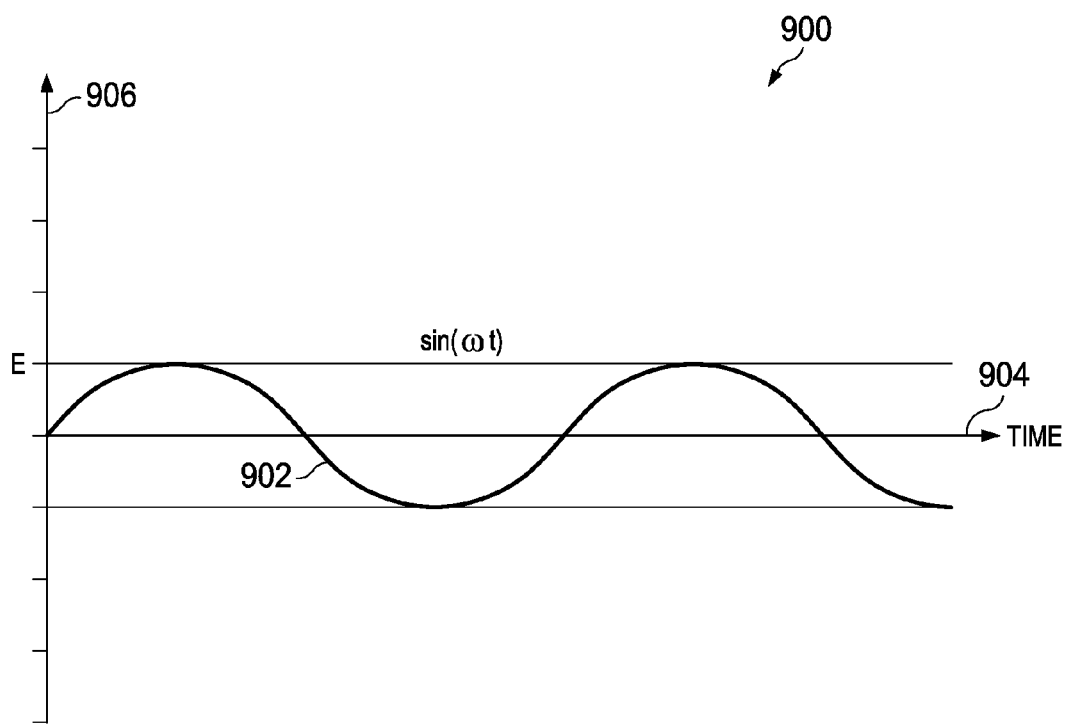
FIGS. 9-13 are illustrations of graphs illustrating power density distributions in an area in which collimated beams overlap in accordance with an advantageous embodiment.

In FIG. 9, an illustration of intensity for a single collimated beam is depicted in accordance with an advantageous embodiment. In graph 900, signal 902 shows fluctuations in amplitude of an electrical field for a single collimated beam. Axis 904 represents time, while axis 906 represents amplitude of the electric field.

Figure 10:
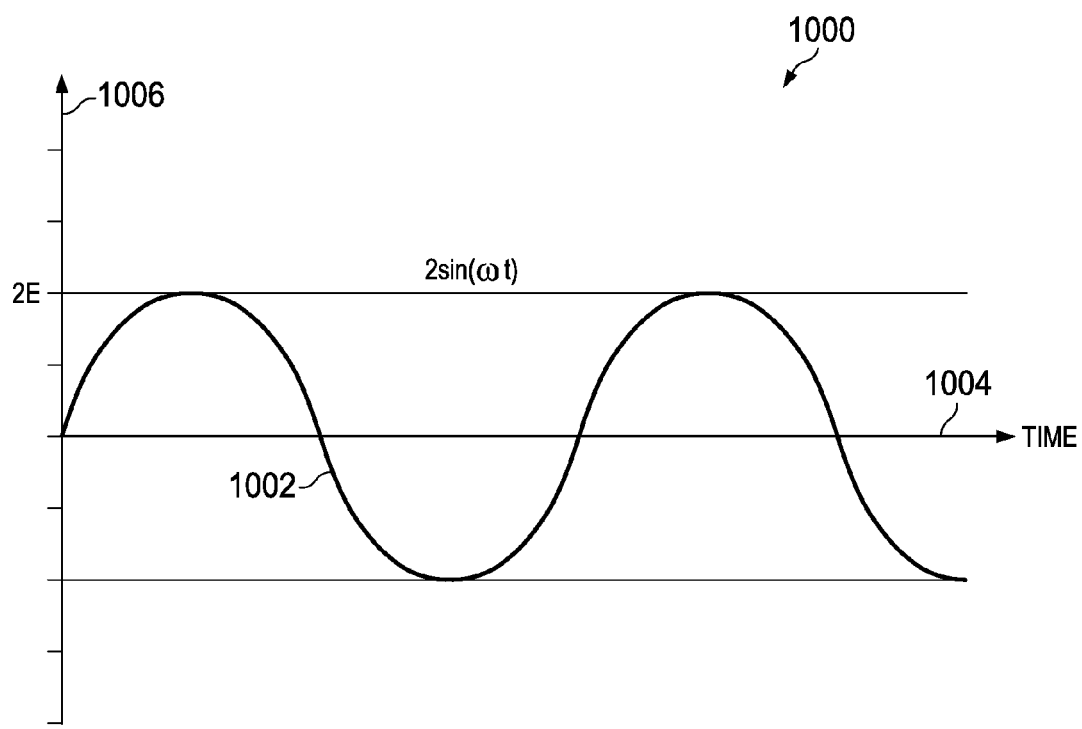

With reference now to FIG. 10, an illustration of intensity for an overlap of two collimated beams is depicted in accordance with an advantageous embodiment. In this example, signal 1002 in graph 1000 illustrates the electrical field generated when two collimated beams overlap each other in an area. Axis 1004 represents time, while axis 1006 represents the amplitude of the electrical field.

Figure 11:
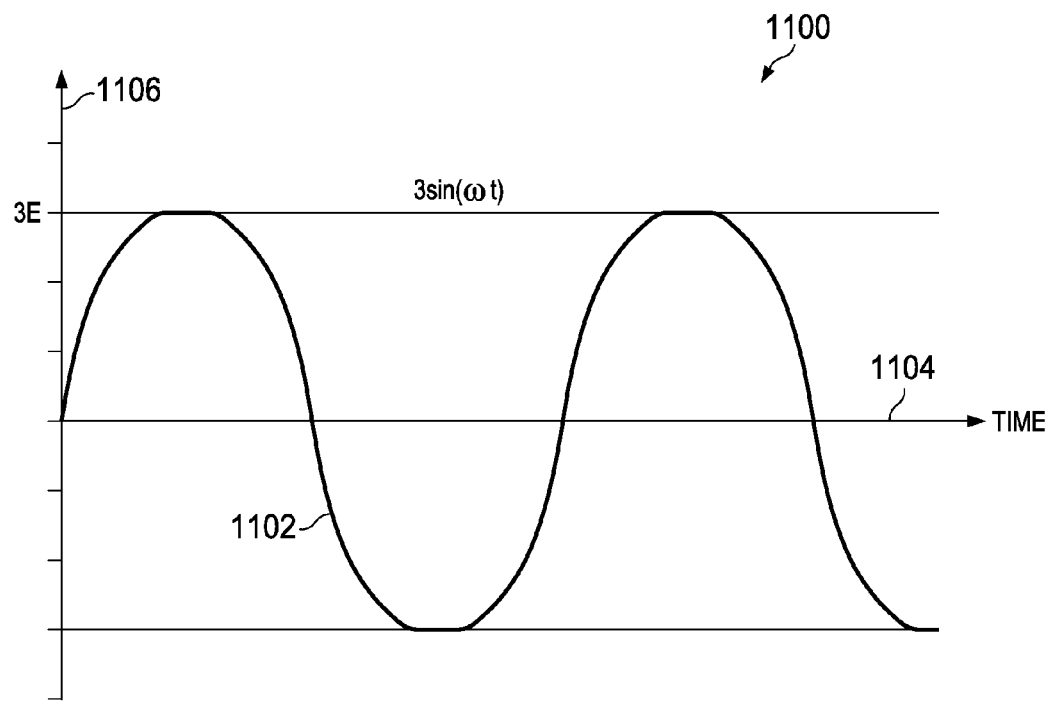

With reference now to FIG. 11, an illustration of intensity for an overlap of three collimated beams in an area is depicted in accordance with an advantageous embodiment. In graph 1100, signal 1102 illustrates the amplitude of an electrical field when three collimated beams overlap each other in an area. Axis 1104 represents time, while axis 1106 represents the amplitude of the electrical field.

Figure 12:
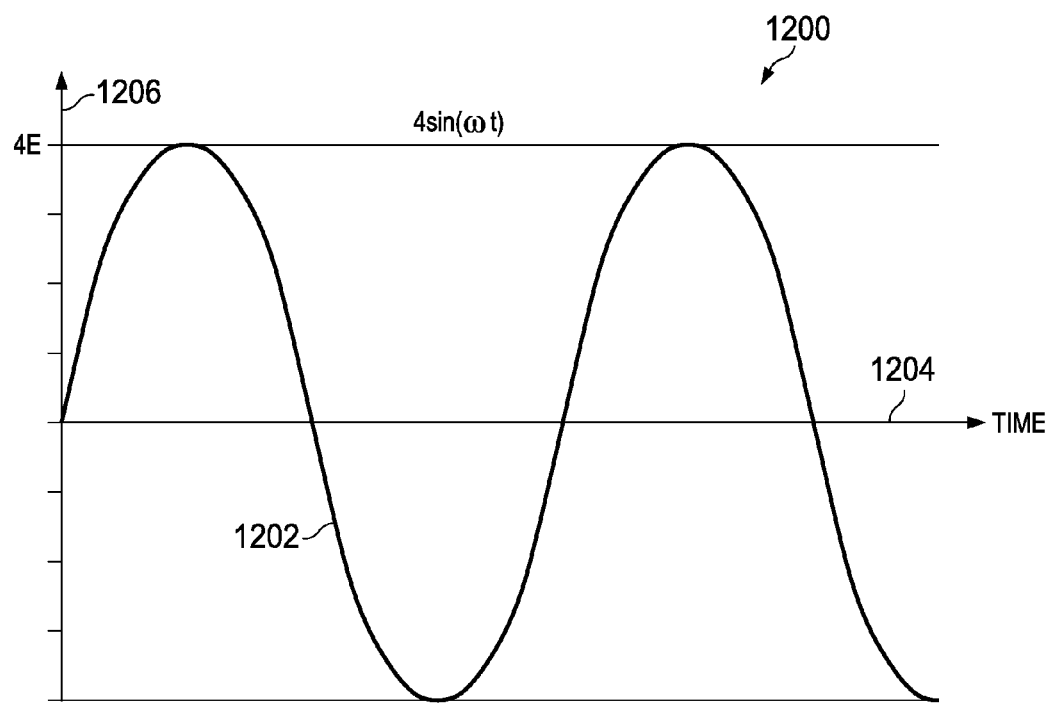

With reference now to FIG. 12, an illustration of intensity for an overlap of four collimated beams in an area is depicted in accordance with an advantageous embodiment. In this example, graph 1200 depicts signal 1202. Signal 1202 represents the electrical field present in an area where four collimated beams overlap each other in an area. Axis 1204 represents time, while axis 1206 represents the amplitude of the electrical field.

Figure 13:
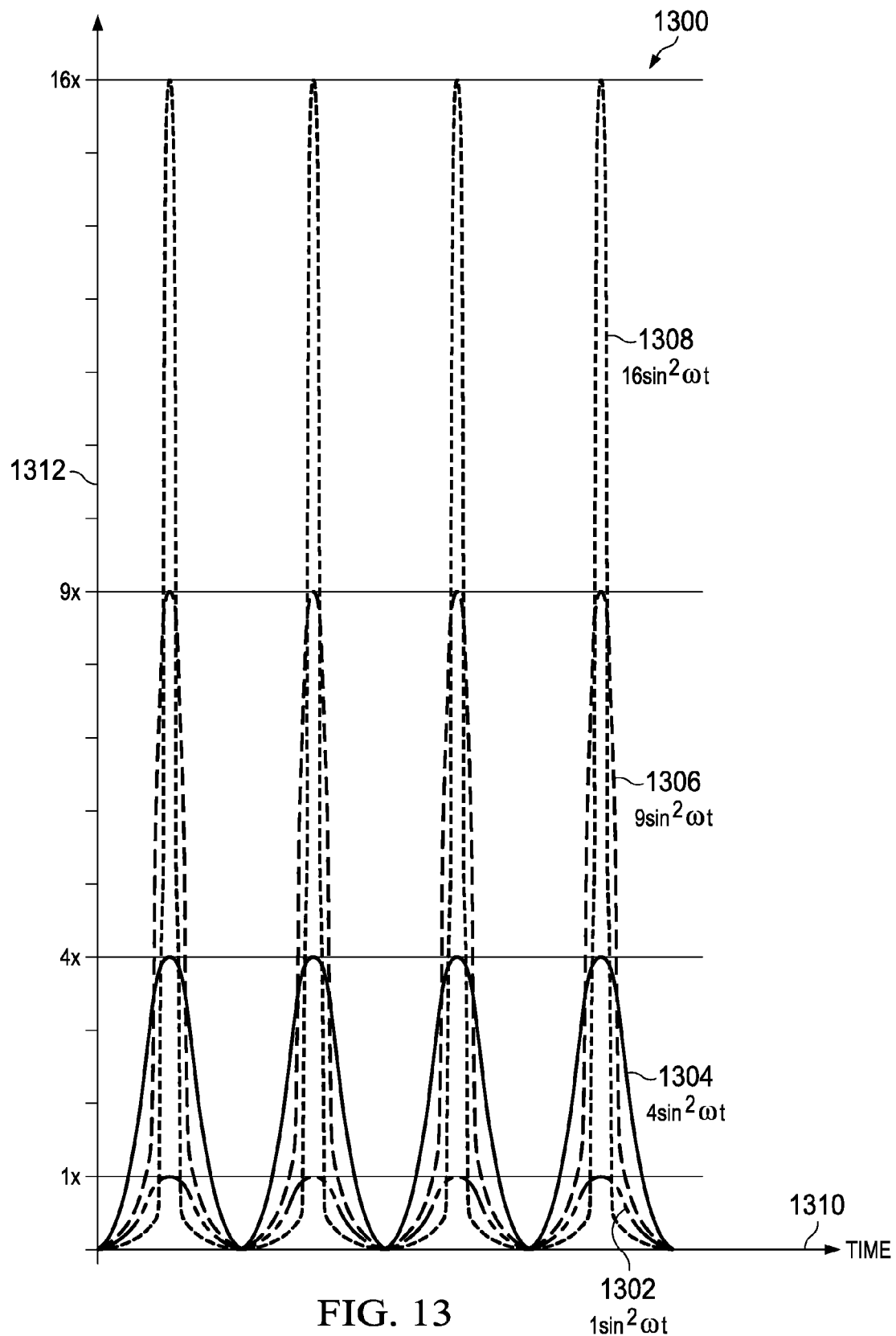

With reference now to FIG. 13, an illustration of intensity generated by the electrical fields from collimated beams overlapping each other at an area is depicted in accordance with an advantageous embodiment. In this illustrative example, graph 1300 illustrates signals 1302, 1304, 1306, and 1308. Axis 1310 represents time, while axis 1312 represents intensity for the electrical field.

Signal 1302 corresponds to intensity generated by one collimated beam. Signal 1304 represents the intensity generated by an overlap of two collimated beams. Signal 1306 represents the intensity generated by three collimated beams that overlap in an area. Signal 1308 represents the intensity generated by four collimated beams overlapping at an area.

Figure 14:
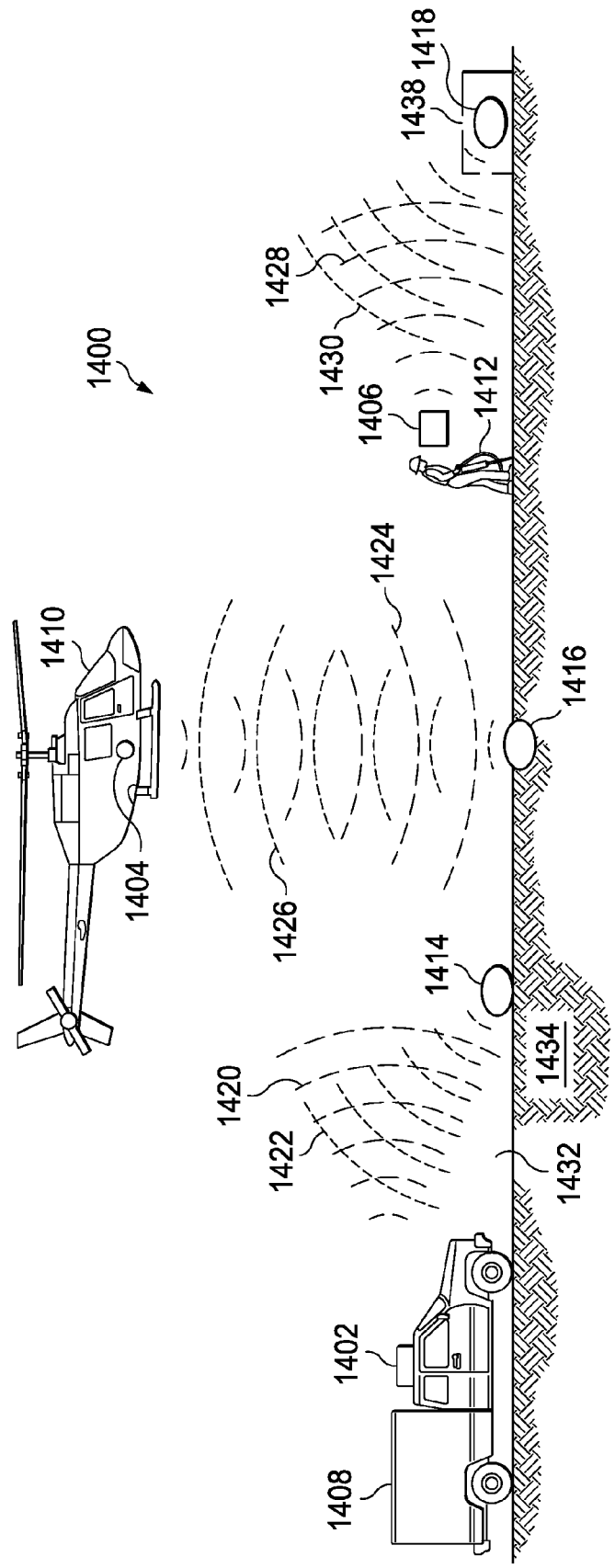
FIG. 14 is an illustration of various detection environments in accordance with an advantageous embodiment.

With reference now to FIG. 14, an illustration of various detection environments is depicted in accordance with an advantageous embodiment. Environment 1400 is an example of one implementation for detection environment 100 in FIG. 1. In this illustrative example, three types of detection systems are depicted in environment 1400. Environment 1400 includes detection systems 1402, 1404, and 1406. These detection systems are examples of implementations of detection system 102 in FIG. 1. These detection systems are mounted on platforms in the form of truck 1408, helicopter 1410, and portable instrument 1412.

These detection systems may be used to detect objects, such as objects 1414, 1416, and 1418. By detecting objects in these examples, these detection systems may detect a presence of objects 1414, 1416, and 1418, as well as identify these objects within environment 1400.

Detection system 1402 generates electromagnetic signals 1420 in the form of four collimated beams, which may encounter object 1414. In response to object 1414 having non-linear electrical characteristics, response 1422 is generated and detected by the receiver part of detection system 1402.

In a similar fashion, detection system 1404 in helicopter 1410 generates electromagnetic signals in the form of four collimated beams that overlap at object 1416. In these illustrative examples, electromagnetic signals 1424 may be millimeter wave range signals. In response to object 1416 having non-linear electrical characteristics, response 1426 is generated and detected by the receiver part of detection system 1404.

Detection system 1406 in portable housing 1412 also generates electromagnetic signals 1428 in the form of four collimated beams. Object 1418 generates response 1430 if object 1418 has non-linear electrical characteristics. Response 1430 is detected by the receiver part of detection system 1406.

These different detection systems may detect the presence of and identify objects 1414, 1416, and 1418. Further, if objects 1414, 1416, and 1418 are visible, detecting the presence of objects at particular locations may be unnecessary. Instead, different signals may be used to identify these objects.

In the illustrative example, object 1414 may be on surface 1432 of ground 1434. Object 1416 may be under surface 1432 of ground 1434. Object 1418 may be hidden within box 1438. In this manner, object 1416 may be at a location selected from one of under the ground, on the ground, in a structure, and on a person.

Figure 15:
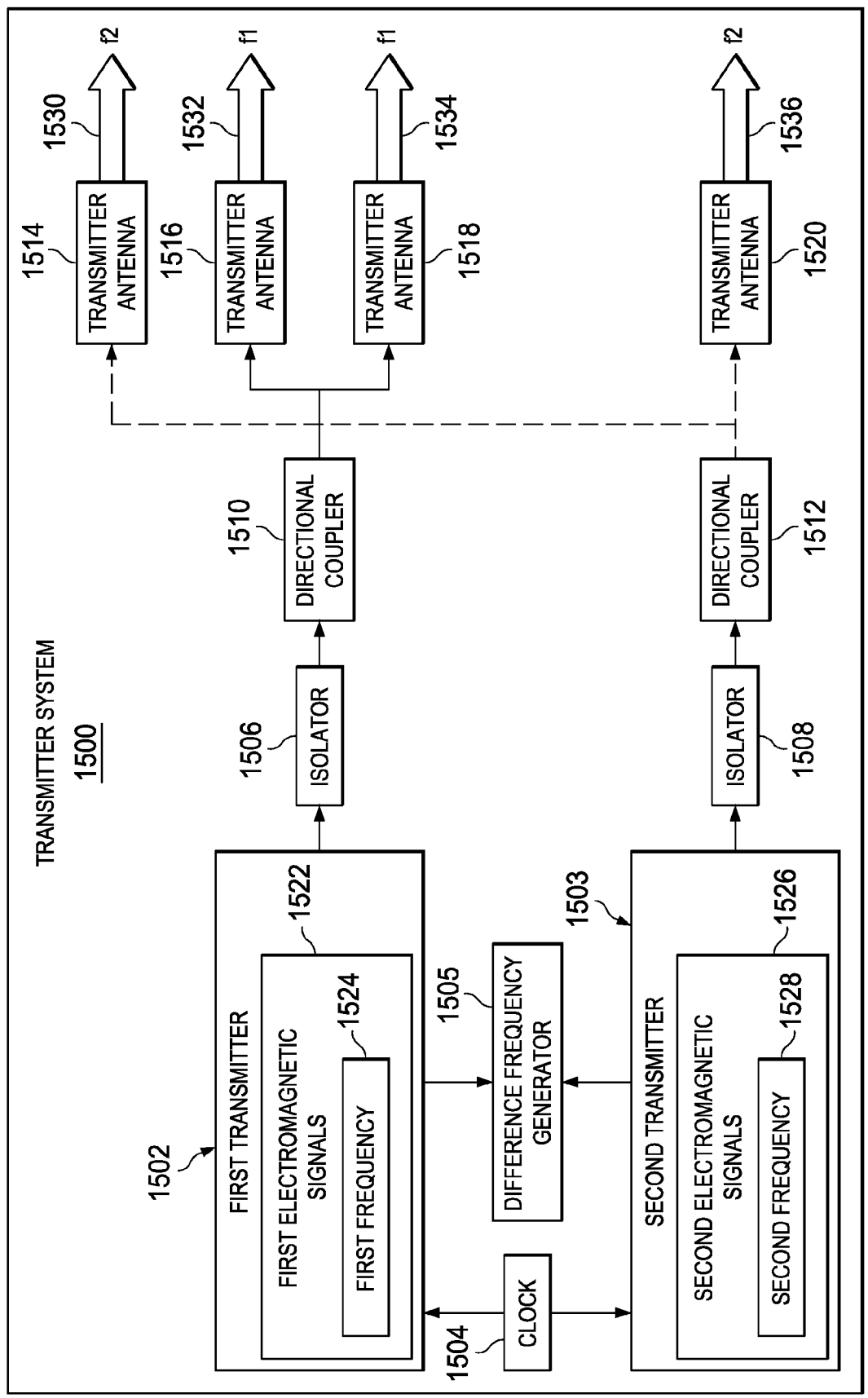
FIG. 15 is an illustration of a block diagram of a transmitter system in accordance with an advantageous embodiment.

With reference next to FIG. 15, an illustration of a block diagram of a transmitter system is depicted in accordance with an advantageous embodiment. Transmitter system 1500 is an example of one implementation for transmitter system 110 in detection system 102 in FIG. 1. In this illustrative example, transmitter system 1500 is an example of an apparatus that may be implemented in various detection systems used in detecting the presence of and/or identifying objects.

In this illustrative example, transmitter system 1500 includes first transmitter 1502, second transmitter 1503, clock 1504, difference frequency generator 1505, isolator 1506, isolator 1508, directional coupler 1510, directional coupler 1512, transmitter antenna 1514, transmitter antenna 1516, transmitter antenna 1518, and transmitter antenna 1520.

In these illustrative examples, transmitter system 1500 is configured to generate electromagnetic energy that is transmitted as collimated beams having a number of characteristics. These characteristics include, for example, without limitation, frequency, amplitude, polarization, intensity, and/or other suitable characteristics.

For example, first transmitter 1502 generates first electromagnetic signals 1522 having first frequency 1524. In this illustrative example, first frequency 1524 is about 94 gigahertz. Second transmitter 1503 generates second electromagnetic signals 1526 having second frequency 1528. Second frequency 1528 is about 88 gigahertz in this example.

Clock 1504 provides a clock pulse for the generation of first electromagnetic signals 1522 and second electromagnetic signals 1526 by first transmitter 1502 and second transmitter 1503, respectively. Further, in this illustrative example, difference frequency generator 1505 generates a difference frequency for first transmitter 1502 and second transmitter 1503. The difference frequency is equal to the difference between first frequency 1524 and second frequency 1528, which is about six gigahertz. In this illustrative example, the difference frequency generated by difference frequency generator 1505 may be monitored such that the difference frequency remains substantially constant. The difference frequency may fluctuate in response to temperature changes, weather changes, the aging of components within transmitter system 1500, and/or other suitable events.

In this illustrative example, first electromagnetic signals 1522 are sent through isolator 1506 to directional coupler 1510, and second electromagnetic signals 1526 are sent through isolator 1508 to directional coupler 1512. Isolator 1506 and isolator 1508 prevent reflections of the electromagnetic signals from directional coupler 1510 and directional coupler 1512, respectively, from interfering with first transmitter 1502 and second transmitter 1503, respectively.

Directional coupler 1510 and directional coupler 1512 are selected to provide an equal split of the electromagnetic signals. In other words, directional coupler 1510 splits first electromagnetic signals 1522 into two equal portions that are sent to transmitter antenna 1516 and transmitter antenna 1518. Directional coupler 1512 splits second electromagnetic signals 1526 into two equal portions that are sent to transmitter antenna 1514 and transmitter antenna 1520. In this illustrative example, directional coupler 1510 and directional coupler 1512 may be 3-decibel couplers that provide an equal split of the electromagnetic signals.

In this illustrative example, transmitter antennas 1514, 1516, 1518, and 1520 receive electromagnetic energy from first transmitter 1502 and second transmitter 1503. These transmitter antennas radiate the electromagnetic energy as electromagnetic signals in the form of beams 1530, 1532, 1534, and 1536. These beams are collimated beams in these examples. Beam 1532 and beam 1534 have first frequency f1. Beam 1530 and beam 1536 have second frequency f2.

As depicted, transmitter antennas 1514, 1516, 1518, and 1520 are positioned in a spatial arrangement in a sequence such that beams 1530, 1532, 1534, and 1536 may overlap at an area on an object. The spatial arrangement and the sequence are selected such that a pattern of intensities is generated in the area on the object. In this example, the sequence is a sequence of frequencies.

The illustration of transmitter system 1500 in FIG. 15 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in other advantageous embodiments, additional transmitters, in addition to first transmitter 1502 and second transmitter 1503, may be present. These additional transmitters may have additional frequencies, in addition to first frequency f1 and second frequency f2. For example, four frequencies may be used. The frequencies may be selected in a sequence that causes movement of sections within the pattern of intensities. Further, the selection of the frequencies may be such that the speed of the movement of the sections may be controlled. In yet other advantageous embodiments, beams 1530, 1532, 1534, and 1536 may not be collimated beams.

Figure 16:
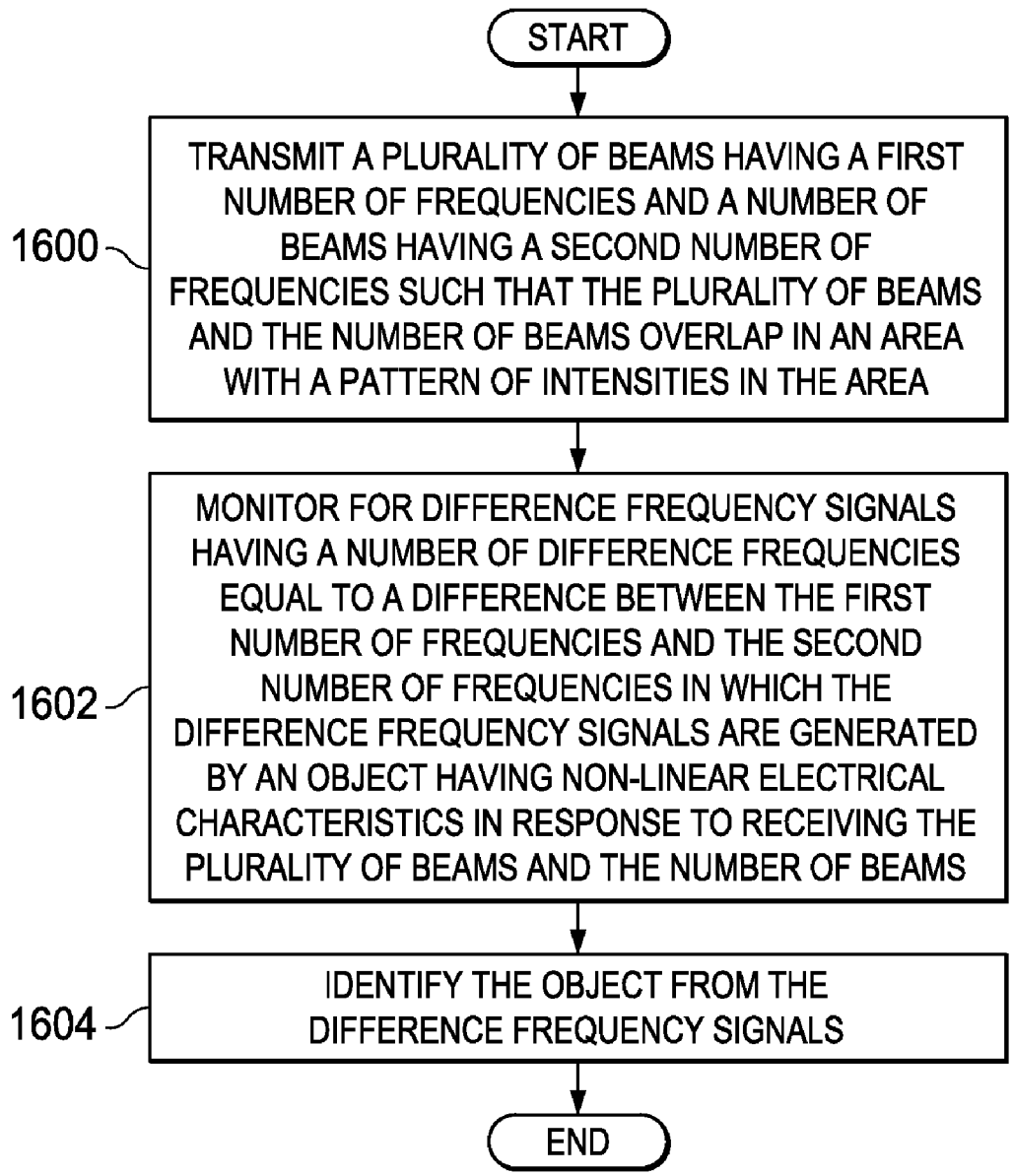
FIG. 16 is an illustration of a flowchart of a process for transmitting beams of electromagnetic signals in accordance with an advantageous embodiment.

With reference now to FIG. 16, an illustration of a flowchart of a process for transmitting beams of electromagnetic signals is depicted in accordance with an advantageous embodiment. The process illustrated in FIG. 16 may be implemented using detection environment 100 in FIG. 1.

The process begins by transmitting a plurality of beams having a first number of frequencies and a number of beams having a second number of frequencies such that the plurality of beams and the number of beams overlap in an area with a pattern of intensities in the area (operation 1600). The process then monitors for difference frequency signals having a number of difference frequencies equal to a difference between the first number of frequencies and the second number of frequencies in which the difference frequency signals are generated by an object having non-linear electrical characteristics in response to receiving the plurality of beams and the number of beams (operation 1602). The process then identifies the object from the difference frequency signals (operation 1604), with the process terminating thereafter.

Figure 17:
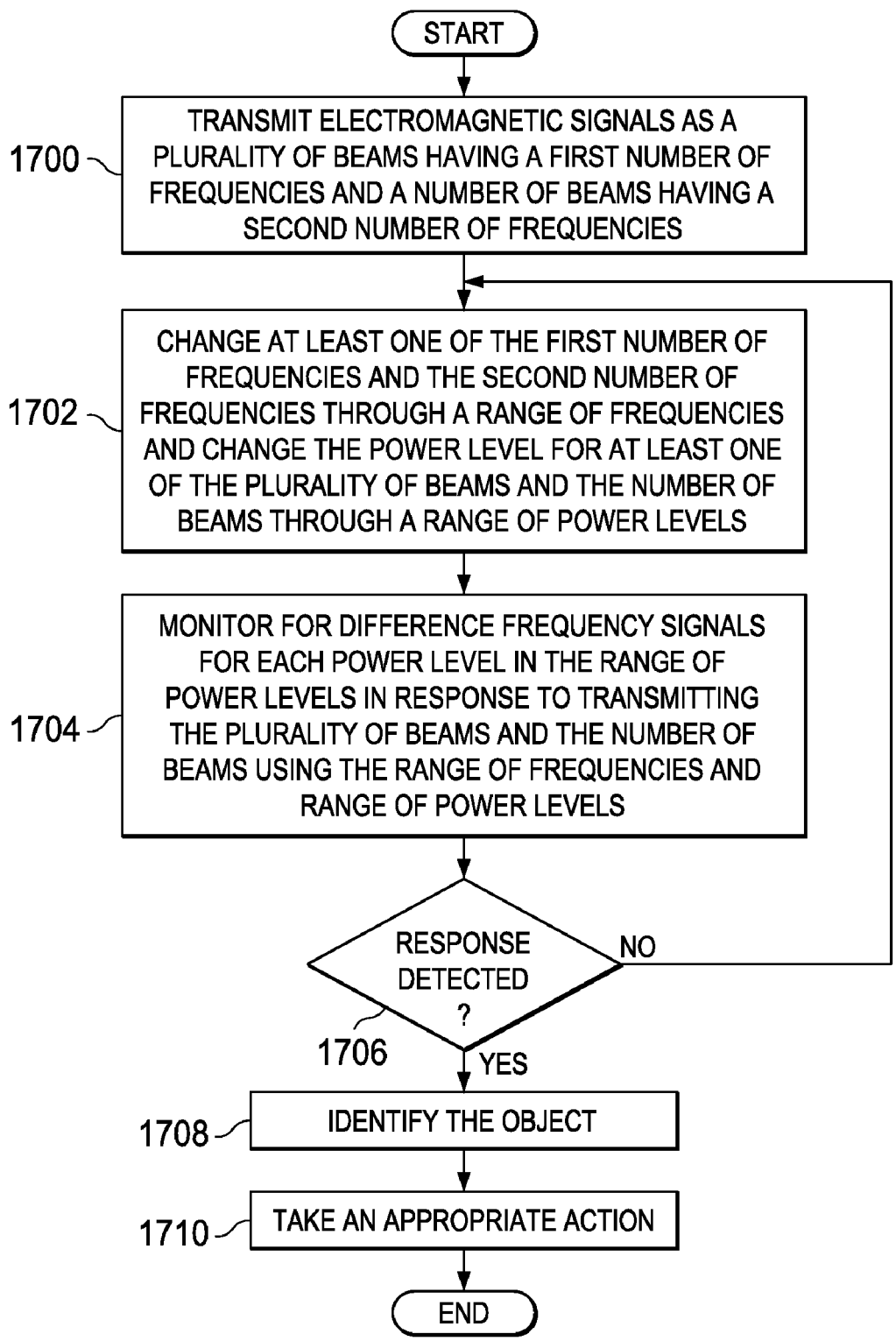
FIG. 17 is an illustration of a flowchart of a process for detecting objects in accordance with an advantageous embodiment.

With reference now to FIG. 17, an illustration of a flowchart of a process for detecting objects is depicted in accordance with an advantageous embodiment. The process illustrated in FIG. 17 may be implemented in detection environment 100 in FIG. 1. More specifically, the process illustrated in this example may be implemented in detection system 102 within detection environment 100.

The process begins by transmitting electromagnetic signals as a plurality of beams having a first number of frequencies and a number of beams having a second number of frequencies (operation 1700). In these illustrative examples, the plurality of beams and the number of beams may take the form of collimated beams. Of course, the electromagnetic signals may take other forms in other advantageous embodiments.

The process then changes at least one of the first number of frequencies and the second number of frequencies through a range of frequencies and changes the power level for at least one of the plurality of beams and the number of beams through a range of power levels (operation 1702). The process then monitors for difference frequency signals for each power level in the range of power levels in response to transmitting the plurality of beams and the number of beams using the range of frequencies and range of power levels (operation 1704). The difference frequency signals are generated by an object having non-linear electrical characteristics in response to receiving the plurality of beams and the number of beams.

A determination is made as to whether a response has been detected (operation 1706). If a response is not detected, the process returns to operation 1702. Otherwise, the object is identified (operation 1708). In identifying the object, the object may be identified as a particular object by comparing the response to a profile or other information for known objects. The object also may be identified as an unknown object if a match is not found with information for known objects. Further, the response may be analyzed to identify the object.

After the object is identified, an appropriate action is taken (operation 1710), with the process terminating thereafter. These actions may include, for example, without limitation, avoiding the object, destroying the object, retrieving the object, sending an alert about the object, and/or other suitable operations.

Figure 18:
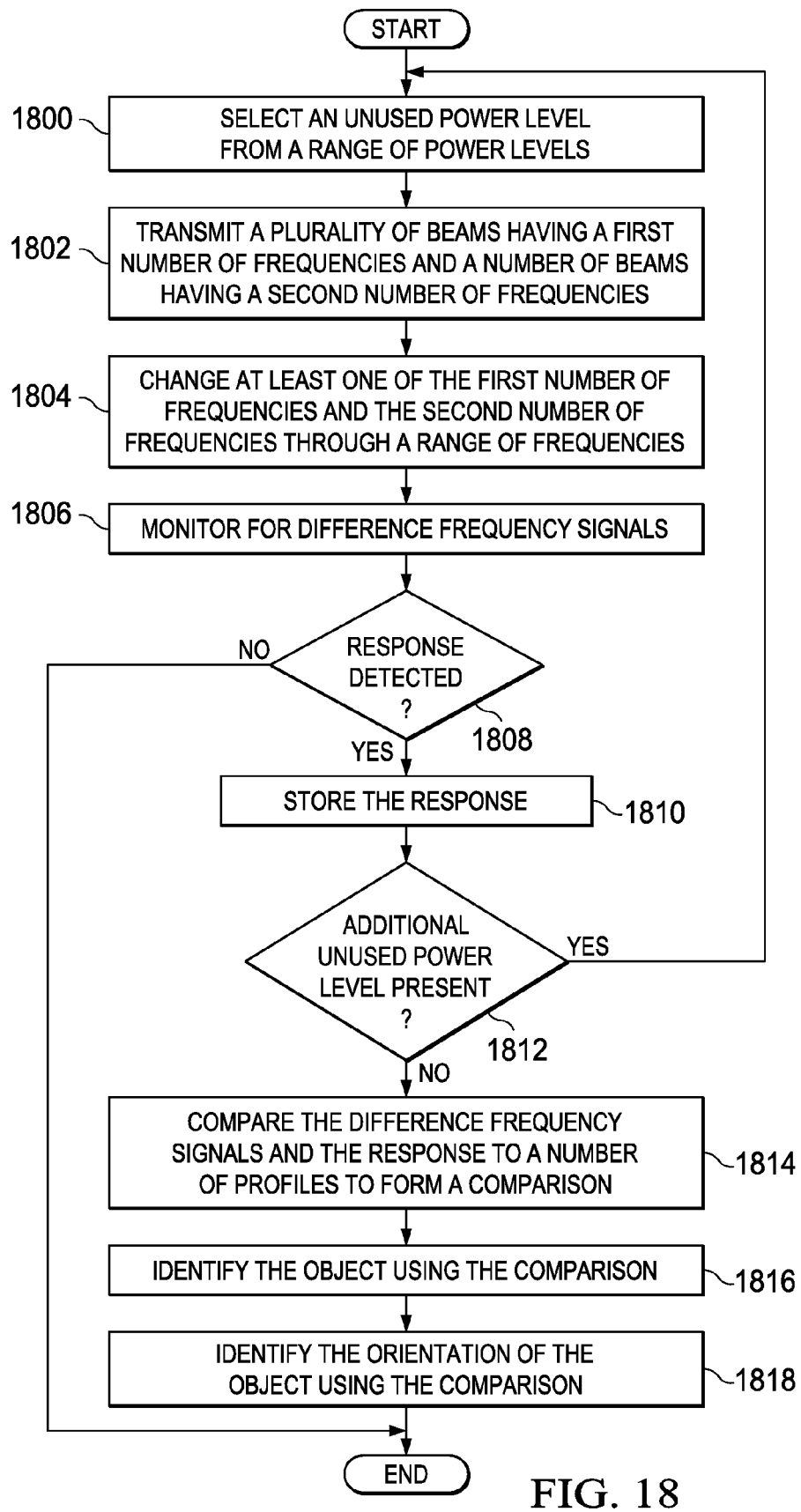
FIG. 18 is an illustration of a flowchart of a process for detecting objects in accordance with an advantageous embodiment.

With reference now to FIG. 18, a flowchart of a process for detecting objects is depicted in accordance with an advantageous embodiment. The process illustrated in FIG. 18 may be implemented in detection environment 100 in FIG. 1. In particular, the different operations may be performed using detection system 102 in detection environment 100.

The process begins by selecting an unused power level from a range of power levels (operation 1800). Next, the process transmits a plurality of beams having a first number of frequencies and a number of beams having a second number of frequencies (operation 1802). The plurality of beams and the number of beams may be collimated beams in these examples.

Thereafter, the process changes at least one of the first number of frequencies and the second number of frequencies through a range of frequencies (operation 1804). In operation 1804, the frequency of at least one of the first number of frequencies and the second number of frequencies is changed using the frequencies as identified in the range of frequencies.

In these examples, the frequencies start at one end of the range and move to the other end of the range in a sweep fashion. Depending on the implementation, both the first number of frequencies and the second number of frequencies may be assigned a portion of the range from which changes to both frequencies are made. In yet other examples, only one of the number of frequencies is changed using the range.

Next, the process monitors for difference frequency signals (operation 1806). The process then determines whether a response is detected in response to the transmission of the plurality of beams and the number of beams (operation 1808). If a response is not detected, the process terminates.

If a response is detected, the response is stored (operation 1810). The process then determines whether an additional unused power level is present in the range of power levels (operation 1812). If an additional unused power level is present, the process returns to operation 1800 to select another unused power level from the range of power levels.

Otherwise, the difference frequency signals and the response are compared to a number of profiles to form a comparison (operation 1814). The object is identified using the comparison (operation 1816). The orientation of the object also may be identified using the comparison (operation 1818), with the process terminating thereafter.

Figure 19:
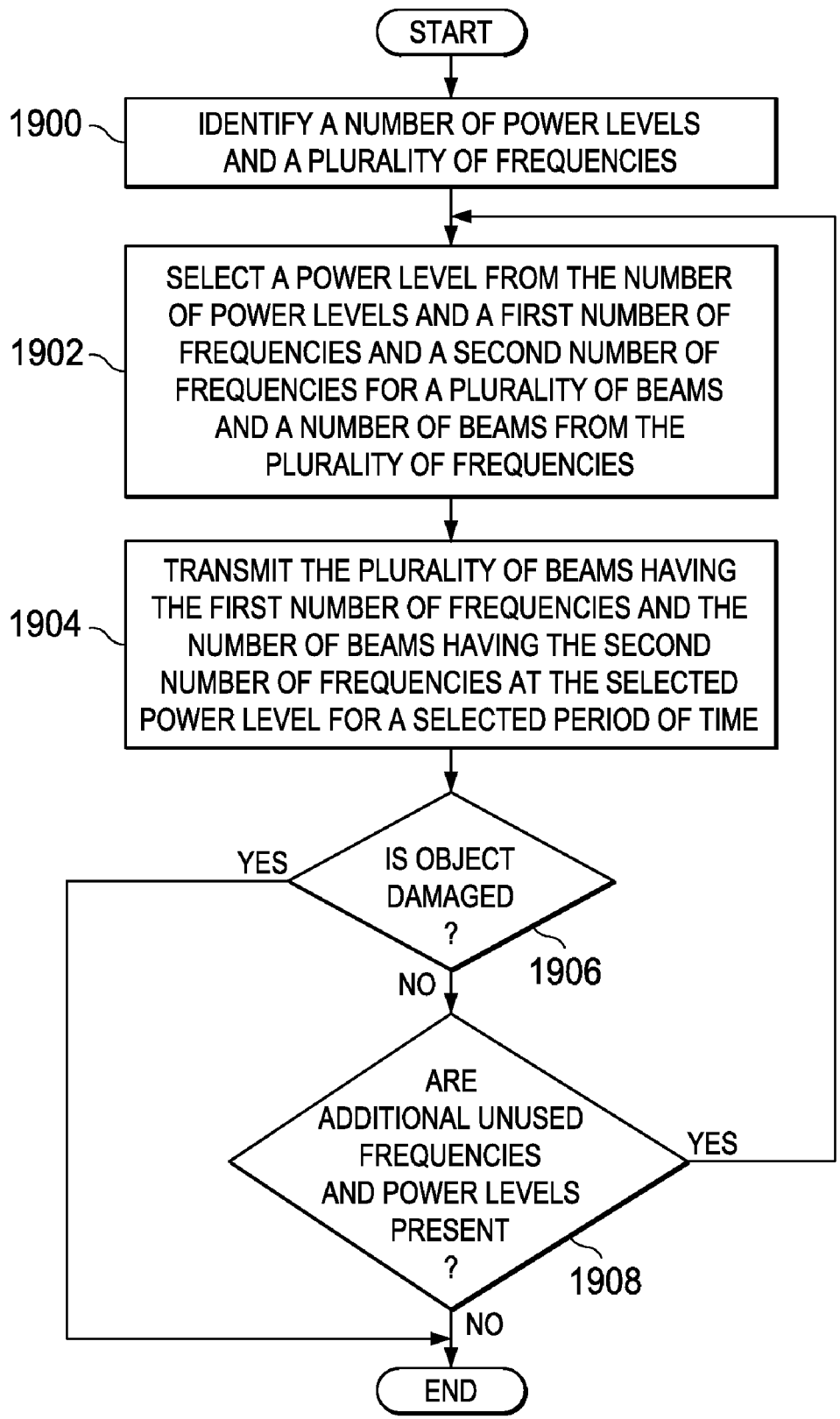
FIG. 19 is an illustration of a flowchart of a process for damaging an object in accordance with an advantageous embodiment.

With reference now to FIG. 19, an illustration of a flowchart of a process for damaging an object is depicted in accordance with an advantageous embodiment. The process illustrated in FIG. 19 may be implemented in detection environment 100 using detection system 102 in FIG. 1. This process may be used after an object has been identified using the process illustrated in FIG. 16.

The process may begin by identifying a number of power levels and a plurality of frequencies (operation 1900). The number of power levels and the plurality of frequencies may be ones that correspond to power levels and frequencies that may damage an object.

The process then selects a power level from the number of power levels and a first number of frequencies and a second number of frequencies for a plurality of beams and a number of beams from the plurality of frequencies (operation 1902). Thereafter, the process transmits the plurality of beams having the first number of frequencies and the number of beams having the second number of frequencies at the selected power level for a selected period of time (operation 1904).

The process then determines whether the object has been damaged using the selected power level (operation 1906). If the object has been damaged, the process terminates. Otherwise, the process determines whether additional unused power levels and frequencies are present (operation 1908). If additional unused power levels and frequencies are present, the process returns to operation 1902. In some advantageous embodiments, when the object is undamaged by the currently selected power level, the process may select a new power level that is higher than the currently selected power level upon returning to operation 1902. With reference again to operation 1908, if additional unused power levels or frequencies are not present, the process terminates.

The process illustrated in FIG. 19 may be used to damage one or more components in an object. The damage may, for example, without limitation, cause the object to become inoperable, explode, have less functionality, and/or some other desired result.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, comprising:
a transmitter system is configured to transmit a plurality of beams having a first number of frequencies and a number of beams having a second number of frequencies;
a receiver system capable of monitoring for difference frequency signals having a number of difference frequencies equal to a difference between the first number of frequencies and the second number of frequencies, wherein the difference frequency signals are generated by an object having non-linear electrical characteristics in response to receiving the plurality of beams and the number of beams; and
a processor unit connected to the transmitter system and the receiver system, wherein the processor unit is configured to control operation of the transmitter system to transmit the plurality of beams having the first number of frequencies and the number of beams having the second number of frequencies to overlap in an area with a pattern of intensities in the area.

2. The apparatus of claim 1, wherein the plurality of beams and the number of beams are positioned in a spatial arrangement to overlap in the area with the pattern of intensities in the area.

3. The apparatus of claim 2, wherein the spatial arrangement is selected from one of a one-dimensional array, a two-dimensional array, an array in a shape of a circle, and an array in a shape of a curve.

4. The apparatus of claim 2, wherein the plurality of beams and the number of beams are positioned in the spatial arrangement to overlap in the area with the pattern of intensities in the area such that the pattern of intensities remains stationary.

5. The apparatus of claim 2, wherein the plurality of beams and the number of beams are positioned in the spatial arrangement to overlap in the area with the pattern of intensities in the area such that the pattern of intensities moves within the area as a function of time.

6. The apparatus of claim 1, wherein the first number of frequencies comprises a first frequency and the second number of frequencies comprises a second frequency.

7. The apparatus of claim 1, wherein the first number of frequencies comprises a first frequency and a second frequency and the second number of frequencies comprises the first frequency and the second frequency.

8. The apparatus of claim 1, wherein the first number of frequencies comprises a first frequency and a second frequency and the second number of frequencies comprises a third frequency and a fourth frequency.

9. The apparatus of claim 1, wherein the plurality of beams is a plurality of collimated beams and the number of beams is a number of collimated beams.

10. The apparatus of claim 1, wherein the transmitter system transmits the plurality of beams and the number of beams with a convergence angle at the area.

11. The apparatus of claim 1 further comprising:
a number of phase shifters, wherein the number of phase shifters shifts the second number of frequencies for the number of beams.

12. The apparatus of claim 1, wherein the pattern of intensities comprises a plurality of sections that are selected from parallel linear sections and concentric circular sections.

13. The apparatus of claim 12, wherein the processor unit is configured to control the transmitter system such that a spacing between the plurality of sections in the pattern of intensities is determined using the following equation:

$$\lambda_s = \frac{\lambda_o}{2\left[\sin\left(\frac{\theta}{2}\right)\right]}$$

wherein $\lambda_s$ is the spacing between the plurality of sections, $\lambda_o$ is a wavelength, and $\theta$ is a convergence angle.

14. The apparatus of claim 1, wherein the transmitter system comprises a plurality of transmitters configured to transmit the plurality of beams and the number of beams with a convergence angle.

15. The apparatus of claim 1, wherein the processor unit is capable of operating the transmitter system to change a power level through a range of frequencies and controlling the pattern of intensities such that the plurality of beams and the number of beams damage the object.

16. The apparatus of claim 15, wherein the object is damaged in a manner that causes the object to one of be inoperable, explode, and have less functionality.

17. The apparatus of claim 1, wherein the first number of frequencies and the second number of frequencies are frequencies from about 30 megahertz to about 300 gigahertz.

18. The apparatus of claim 1, wherein the difference frequency signals detected form a response, and wherein the processor unit is configured to identify the object using the response.

19. The apparatus of claim 18, wherein the processor unit is capable of comparing the response to a number of profiles of known objects.

20. The apparatus of claim 1, wherein the object is at a location selected from one of under a ground, on the ground, in a structure, and on a person.

21. A method for transmitting beams of electromagnetic energy, the method comprising:
transmitting a plurality of beams having a first number of frequencies and a number of beams having a second number of frequencies in which the plurality of beams and the number of beams overlap each other at an area with a pattern of intensities in the area; and
monitoring for difference frequency signals having a number of difference frequencies equal to a difference between the first number of frequencies and the second number of frequencies, wherein the difference frequency signals are generated by an object having nonlinear electrical characteristics in response to receiving the plurality of beams and the number of beams.

22. The method of claim 21, wherein the difference frequency signals form a response and further comprising:
comparing the response to a number of profiles to form a comparison; and
identifying the object using the comparison.

23. The method of claim 21, wherein a first plurality of collimated beams and a second plurality of collimated beams are positioned in a spatial arrangement to overlap each other at the area with the pattern of intensities in the area.

24. The method of claim 23, wherein the plurality of beams and the number of beams are positioned in the spatial arrangement to overlap the each other at the area with the pattern of intensities in the area such that the pattern of intensities remains stationary.

25. The method of claim 23, wherein the plurality of beams and the number of beams are positioned in the spatial arrangement to overlap the each other at the area with the pattern of intensities in the area such that the pattern of intensities moves within the area as a function of time.

\* \* \* \* \*